2,893,702
Patented July 7, 1959

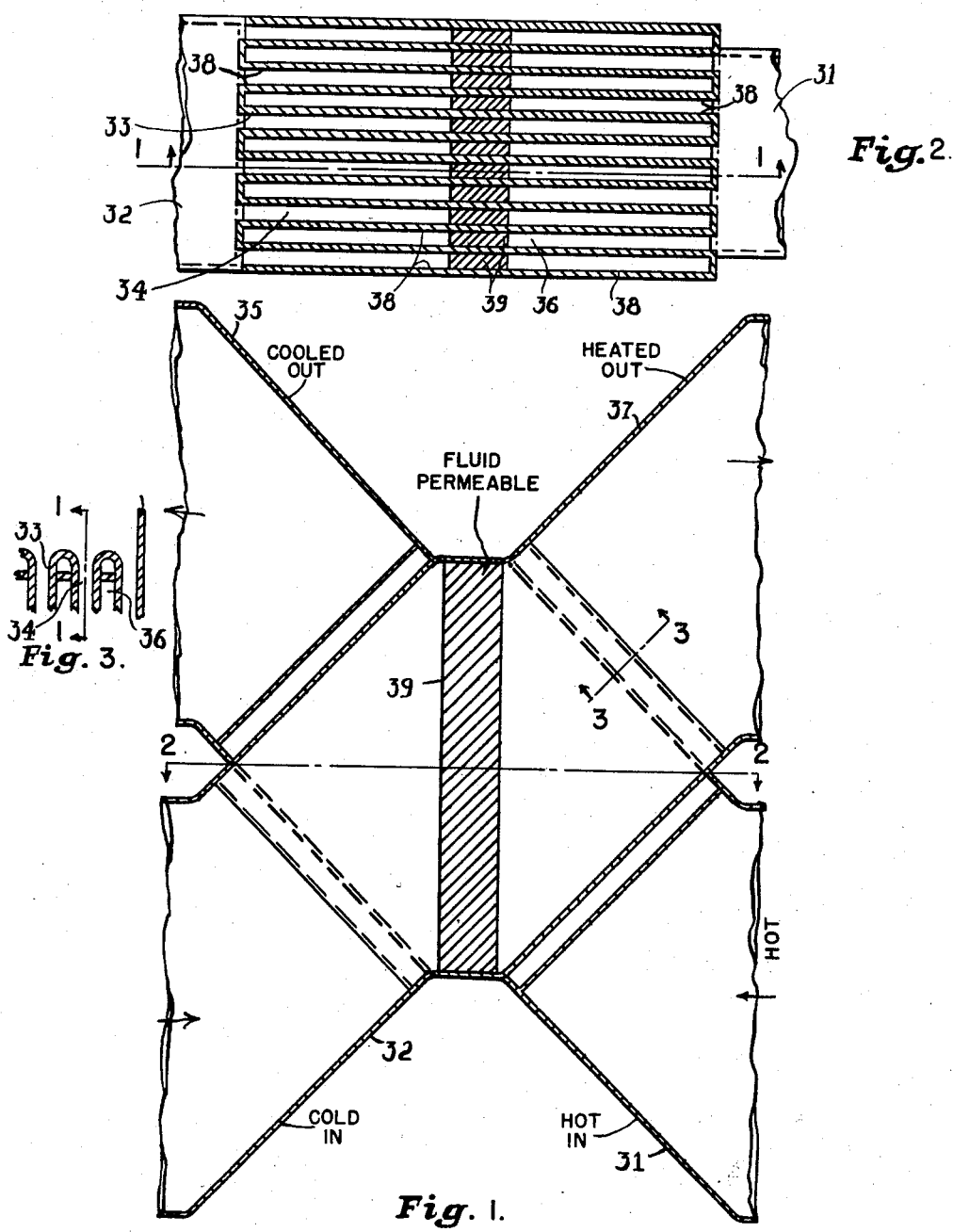

2,893,702
HEAT EXCHANGE APPARATUS

Edward Adams Richardson, Bethlehem, Pa.

Original application December 12, 1947, Serial No. 791,200, now Patent No. 2,774,566, dated December 18, 1956. Divided and this application September 20, 1956, Serial No. 610,922

4 Claims. (Cl. 257—245)

This invention relates to heat exchange apparatus. More particularly it relates to a method and apparatus for the transfer of heat involving the use of material which is permeable to fluids.

In connection with gas turbines, the efforts to develop compact heat exchange apparatus for the interchange of heat between fluids required in interstage cooling has been largely unsuccessful due to the failure to overcome the inefficiency inherent in known types of heat interchangers.

The broad object of this invention is to provide more efficient means for the exchange of heat between two fluids.

This and other objects will become apparent from the description.

Briefly the present invention involves the use of fluid permeable materials having good thermal conductivity in conjunction with a fluid.

An important aspect of the invention is the use of permeable bodies having large surface areas per unit of volume or mass which the fluid used may contact combined with a relatively low permeability. Such a body is readily formed by the use of fine mesh particles and closely approaches the desideratum of having all of the fluid being in substantial contact with the solid, the distances for heat flow being made extremely short through the thinness of the individual fluid streams passing through the permeable body.

Whereas most heat exchangers depend upon turbulent flow in which the pressure drop increases nearly as the square of the mass rate of flow, the use of permeable bodies results in a fluid flow which is substantially laminar so that the pressure drop is substantially as the first power of the fluid mass flowing. In general, less power is required for securing the transfer of heat because of this law, while the characteristic curve of power required is more favorable for operation and control.

It will be apparent that wide variations of permeabilities will be used in the embodiments of this invention due to having to compromise at times with other factors such as relative uniformity and rate of flow, strength of material, the ability to pick up heat from another body, and the object to be attained. Generally speaking, permeability is measured in terms of the number of cubic feet of air of an assigned initial temperature such as 70° F. flowing in one hour through each superficial square foot of surface when the pressure drop of the air is one foot of water pressure per foot of permeable body thickness. Such permeabilities may be at least as great as 14 for heat transfer devices to as low as, or even much lower than 0.006 for such fabrications as gas turbine blades.

Where a permeable body is used for maintaining one temperature on a cold surface and another temperature on a hot surface, the following formula is characteristic:

$$G \cdot h = \int_{Tc}^{Th} \frac{K}{Q} \cdot dT$$

where $$Q = \int_{T_F}^{T} Cp \cdot dT$$

G is the rate of fluid flow;
h is the thickness of the permeable material;
$Th$ is the hot surface temperature;
$Tc$ is the cold surface temperature;
K is the conductivity of the solid and contained fluid.

In general the solid free of fluid, and the fluid alone as though stationary, are considered to conduct in parallel in determining K at any point.

T is any inner temperature at a distance $x$ from the cold surface;
$T_F$ is the temperature of the entering fluid;
$Cp$ is the thermal capacity of the entering fluid.

This formula assumes a not too high rate of flow and a permeability such that the difference of temperature, at the distance $x$, between solid and fluid is of the order of a small fraction of a degree Fahrenheit.

In the design of a particular cooling structure, other factors must be considered. The required strength of the structure, the available pumping pressure, the available space and other factors depending on the specific problem are all involved.

Fluid permeable bodies of non-metallic substances suitable for use within the scope of this invention are well known in the art. Examples are bodies formed by bonding variously particles of graphite, carborundum or quartz. Although developed comparatively recently, the manufacture of permeable metal bodies suitable for use in this invention is equally well known. Such bodies are used particularly in the production of filters and clutch plates.

In the production of filters a sintered powdered compact of bronze is commonly used. With a bronze compact, compressive strengths up to 16,000 pounds per square inch may be obtained. A wide range of permeabilities may be obtained by control of the mesh size of the metal particles. Since temperature as high as about 350° F. in an oxygen atmosphere and 900° F. in an atmosphere without oxygen may be applied to copper alloys without progressive building up of oxide and destruction of the permeable bodies, it will be apparent that permeable bodies such as those used in the filter art are well adapted to being used in this invention.

Variously by the use of different alloys, mixtures of principal alloy particles and bonding alloy particles such as copper, heat treatment and greater compaction pressures other even stronger permeable structures have been obtained. Thus an 0.87 percent carbon iron powder and copper bond powder has been pressed, sintered, repressed and resintered to give a body having a compressive strength of 85,000 pounds per square inch. Heat treating this compact results in a compressive strength of 150,000 pounds per square inch.

In filtrant alloys in sintered compacts may be, for example, aluminum bronze with a relatively high melting point, high resistance to oxidation up to about 1000° Fahrenheit, and high strength, Everdur, beryllium-copper, copper-nickel, also copper-nickel-zinc alloys. The copper-nickel alloys are self-protecting against oxidation to 700° Fahrenheit; in addition, many have good resistance to creep up to moderately high temperatures. Even coin and sterling silver as well as gold alloys are valuable where chemical action must be resisted up to perhaps as high as 400° to 600° Fahrenheit. Titanium hydride has been used in compacts to secure a protective alloy surface on the base powder used in the compact. These are but a few of the materials readily available for metal bonding and surface protection.

The control of permeability is secured largely through particle size control and to a less extent through compaction under pressure and the degree of heating during sintering. Final control may be had by passing weak solutions, having a slight solvent action on the compact material, through said compacts to secure the desired permeability within close limits, when the sintered permeability is on the low side. Similarly a weak solution able to deposit metal or non-metallic filler, or colloidal body in the pores may be used to bring the permeability down from too high values. Chemical or electrolytic deposition is possible. Such methods may be used for other purposes such as producing a chemically resistant plate or the establishment of a catalytic material in the pores of the permeable body.

Reference may be made to the following for additional information on fluid permeable materials:

"Design of Powdered Metal Parts" by W. H. Arata in "Product Engineering," vol. XV, No. 8, August 1944, published by McGraw-Hill Publishing Company, Inc., 330 W. 42nd Street, New York 18, N.Y.

"Improved Engineering Properties of Parts Made From Iron Powders," by Claus G. Goetzel in "Product Engineering," vol. 18, No. 8, August 1947, published by McGraw-Hill Publishing Company, Inc., 330 W. 42nd Street, New York 18, N.Y.

"Powder Metallurgy, a Symposium," edited by John Wulff, published by The American Society for Metals, Cleveland, Ohio, 1942.

Other forms of permeable material may be utilized equally well in many applications of the invention provided the permeability is relatively low, the heat conductivity is good and the surface of elements per unit of volume is relatively large. Bodies formed of wire-like or needle-like particles with their axes substantially parallel to each other and to the heat flow and normal to the direction of fluid flow may be used in heat exchangers. In some cases it is practical to use sheet elements having permeability secured by scratching one side of each sheet so that the scratches of one sheet and the relatively smooth surface of an adjacent sheet shall produce the necessary fine passages on bonding the sheets. In general, all bodies used should have reasonably high inherent strength.

It will be apparent that there exists a wide selection of known materials which may be used in this invention. The qualities of strength, ability to stand up under high heat, permeability and heat conductivity may obviously be combined in an infinite number of combinations depending on the characteristics required.

A wide range of fluids may be used in connection with the permeable material. Air and other gases, air or other gas carrying a fog of liquid particles in suspension such as water droplets and water are examples. In most cases the fluids should be properly cleaned so as not to clog the pores through deposition of suspended solids, precipitants or the like. Where fluids may generate solid cracking products, as on heating, such fluids should be avoided or adequate means for cleaning the permeable body at regular intervals should be provided. Preferably they will be non-corrosive and will not dissolve the permeable material.

For some purposes, a gas such as air into which a heavy fog of liquid particles has been introduced will have valuable properties in respect to average density and more particularly heat capacity involving therein the heat absorption on evaporation of the liquid drops.

In the drawings:

Figure 1 is a vertical cross section of a heat exchanger;

Figure 2 is a section taken on a plane indicated at 2—2 in Figure 1;

Figure 3 is a section taken on a plane indicated at 3—3 in Figure 1.

A heat exchange apparatus in accordance with this invention is shown in Figures 1, 2 and 3. Here the invention is applied to the problem of transferring heat from one fluid to another fluid.

Conduit 31 supplies a hot fluid and conduit 32 a cold fluid. Partition member 33 which is made of metal of high heat conductivity forms alternate passages 36 for the hot fluid between conduit 31 and conduit 35 and alternate passages 34 for the cold fluid between conduit 32 and conduit 37. In each passage thus formed, a body 39 of fluid permeable metal of high heat conductivity is located. These bodies are well bonded to the adjacent walls 38 of parition member 33. All the fluids flowing within this system must pass through one of these permeable bodies.

The hot fluid flows from conduit 31 into passage 36 where it transfers some heat to the walls 38 of the passages. It then must pass through the permeable bodies 39 to which it will transfer a very large amount of heat. It will then pass out through the remainder of passages 36 to conduit 35.

The heat transferred to each body 39 in passages 36 will be readily transferred through the walls to which each body is bonded to the permeable bodies in the adjacent passages 34 in which the cooler fluid flows. Thus the cold fluid passes from conduit 32 to passages 34 where it passes through the now heated bodies 39. Heat is transferred from these heated bodies 39 to the cold fluid. The fluid thus heated passes out through conduit 37. There is, of course, some heat exchange also directly through the walls 38.

A further example of an embodiment falling within the scope of this invention is a heat exchanger similar to that shown in Figures 1, 2 and 3 adapted to carry out catalytic chemical reactions. In such an embodiment a suitable finely divided catalytic material adapted to the process being carried out may be deposited in the pores of the permeable material in the heat exchanger passages which are carrying the materials being reacted, while the alternate adjacent passages are carrying a fluid. Such fluid will supply the required heat for the carrying on of an endothermic reaction, or will be adapted to remove the heat generated in an exothermic reaction, the temperature of fluid supplied and the rate of supply being adapted to maintaining within the reaction zone the desired reaction temperature within narrow limits. In such a case, if a permeable metal is used, it might be necessary to first deposit in the pores a thin layer of corrosion resistance material such as, for example, silicate. Permeable material such as, for example, carbon or silica would be suitable.

Thus, it will be apparent that applicant should, in no manner, be limited to the illustrative embodiments illustrated and described.

This application is a division of application Serial No. 791,200, filed December 12, 1947, now Patent No. 2,774,566 granted December 18, 1956.

What is claimed is:

1. In a heat exchanger, a plurality of passages with adjacent passages adapted to carry hot fluids and cool fluids respectively, a common wall of heat conducting material separating adjacent passages, a partition of a rigid body of permeable material dividing each passage, said partitions being bonded in good thermal contact to their adjacent walls in substantial alignment with each other and supporting said walls, means to introduce hot fluids and cool fluids respectively into the passages adapted to carry hot fluids and cool fluids respectively and means to exhaust said fluids after they have passed through the permeable partitions in said passages, whereby heat is exchanged between the hot fluids and the cool fluids through adjacent permeable bodies and their common walls.

2. In a heat exchanger, a plurality of passages with adjacent passages adapted to carry hot fluids and cool fluids respectively, a common wall of heat conducting material separating adjacent passages, a partition of a rigid body of permeable sintered metal dividing each passage, said partitions being bonded in good thermal contact to their adjacent walls in substantial alignment with each other and supporting said walls, means to introduce hot fluids and cool fluids respectively into the passages adapted to carry hot fluids and cool fluids respectively and means to exhaust said fluids after they have passed through the permeable partitions in said passages, whereby heat is exchanged between the hot fluids and the cool fluids through adjacent permeable bodies and their common walls.

3. In a heat exchanger, a plurality of passages with adjacent passages adapted to carry hot fluids and cool fluids respectively, a common wall of heat conducting material separating adjacent passages, a partition of a rigid body of permeable material dividing each passage, said partitions being bonded in good thermal contact to their adjacent walls in substantial alignment with each other and supporting said walls, means to introduce hot fluids and cool fluids respectively into the passages adapted to carry hot fluids and cool fluids respectively, means to exhaust said fluids after they have passed through the permeable partitions in said passages, the sides of said partitions through which the fluids flow all being parallel and the corresponding sides of said partitions lying in substantially the same planes, whereby heat is exchanged between the hot fluids and the cool fluids through adjacent permeable bodies and their common walls.

4. In a heat exchanger, a plurality of passages with adjacent passages adapted to carry hot fluids and cool fluids respectively, a common wall of heat conducting material separating adjacent passages, a partition of a rigid body of permeable sintered metal dividing each passage, said partitions being bonded in good thermal contact to their adjacent walls in substantial alignment with each other and supporting said walls, means to introduce hot fluids and cool fluids respectively into the passages adapted to carry hot fluids and cool fluids respectively, means to exhaust said fluids after they have passed through the permeable partitions in said passages, the sides of said partitions through which the fluids flow all being parallel and the corresponding sides of said partitions lying in substantially the same planes, whereby heat is exchanged between the hot fluids and the cool fluids through adjacent permeable bodies and their common walls.

References Cited in the file of this patent

UNITED STATES PATENTS

| | | |
|---|---|---|
| 1,285,916 | Bradburn et al. | Nov. 26, 1918 |
| 1,716,333 | Vuilleumier | June 4, 1929 |
| 1,815,570 | Jones | July 21, 1931 |
| 1,966,034 | Hensler | July 10, 1934 |
| 2,157,596 | Davis | May 9, 1939 |
| 2,595,457 | Holm et al. | May 6, 1952 |

FOREIGN PATENTS

| | | |
|---|---|---|
| 702,640 | Great Britain | Jan. 20, 1954 |
| 508,965 | Germany | Jan. 22, 1929 |